United States Patent [19]

Clunn

[11] Patent Number: 4,566,125

[45] Date of Patent: Jan. 21, 1986

[54] APPARATUS AND METHOD FOR PATTERN LOCATION

[75] Inventor: Robert H. Clunn, Richardson, Tex.

[73] Assignee: Texas Instruments Incorporated, Dallas, Tex.

[21] Appl. No.: 447,868

[22] Filed: Dec. 8, 1982

[51] Int. Cl.[4] .............................................. G06K 9/20
[52] U.S. Cl. ...................................... 382/48; 382/50; 382/51; 382/52
[58] Field of Search ...................... 382/48, 50, 51, 52, 382/53; 358/101, 107

[56] References Cited

U.S. PATENT DOCUMENTS

| | | | |
|---|---|---|---|
| 3,502,993 | 3/1970 | Schürzinger et al. | 382/53 |
| 3,818,445 | 6/1974 | Neville | 382/48 |
| 3,909,594 | 9/1975 | Allais et al. | 382/53 |
| 3,944,977 | 3/1976 | Holmes et al. | 382/52 |
| 4,200,861 | 4/1980 | Hubach et al. | 382/48 |
| 4,213,117 | 7/1980 | Kembo et al. | 382/48 |
| 4,334,241 | 6/1982 | Kashioka et al. | 382/48 |
| 4,449,240 | 5/1984 | Yoshida | 382/50 |

Primary Examiner—Leo H. Boudreau
Assistant Examiner—Joseph Mancuso
Attorney, Agent, or Firm—Thomas W. Demond; Leo N. Heiting; Melvin Sharp

[57] ABSTRACT

An apparatus and method for locating a pattern within a digital representation of an image. A video camera scans an image of light reflected from the surface of an object. The analog output of the video camera is digitized to form the digital representation. In order to digitize the analog output a threshold signal is provided. A comparator receives both the threshold signal and the analog output. When the difference between the threshold signal and analog exceeds a certain value the comparator changes its output from one digital level to another until the difference is less than the certain value. The threshold signal is produced by an adaptive threshold circuit which integrates the analog output over one scan of the image to form an integrated signal. This integrated signal is the normalized and stored into a sample and hold circuit for use in a subsequent scan as the threshold signal.

6 Claims, 4 Drawing Figures

APPARATUS AND METHOD FOR PATTERN LOCATION

BACKGROUND OF THE INVENTION

1. Field of the Invention

The invention relates to the location of patterns within an image, and more particularly, the invention relates to the location of patterns within an image utilizing an adaptive threshold.

2. Description of the Prior Art

Pattern location systems for locating predetermined patterns within an image are known in the art. A type of location system is shown in U.S. Pat. No. 3,776,447 issued to Adams et al on Dec. 4, 1973 and entitled "Automatic Semiconductor Bonding Machine". In Adams, an object is located and that information is utilized to position a tool for operation on the object. The object in Adams is a semiconductor integrated circuit, and the tool is the bonding head of wire bonder.

In general, a pattern location system determines the location of a pattern within a image by comparing portions of the image with a reference pattern. The image is observed by a video camera. The video camera is positioned to be incident to light reflected from the object. The camera scans the light it receives and produces an analog output which correspondes to the image of the object present in the reflected light. Typically the video camera produces a raster scan of the light reflected from the object. The analog output produced by the video camera has an amplitude varying in proportion to the magnitude of the reflected light at the corresponding location within the image. The light reflected from the object is repeatedly electronically scanned by the video camera.

The analog output of the video camera is digitized and the digital output produced is usually stored in a memory. When the analog output is digitized, a certain amplitude is selected. The analog output is sampled at a known rate. If the amplitude of the analog output when sampled exceeds the certain amplitude, a digital signal of one level is generated. If the amplitude of the analog output when sampled is less than or equal to the certain amplitude, a digital signal of another level is generated. As the digital signals are generated they form a digital output which is stored into a video memory. The storage of the digital output is such that the relationship between the individual digital and the corresponding location of the digital signal within the image is known and maintained.

The digital image within the video memory is compared with a stored reference image. The comparison is usually repeated as the image within the video memory is shifted relative to the reference image. The best match between the reference image, which is the predetermined pattern, is found by the repeated comparisons. The location of the pattern within the video image is noted and the information transferred to an alignment apparatus. The align apparatus is then actuated and the position of the object relative to a tool is altered. An X-Y table can be utilized for this purpose. The motors attached to the table can be actuated and the relative position of the object and tool altered. The motors are usually driven by a displacement device which utilizes the location of the pattern within the stored image to determine the distance and direction of the relative movement necessary to bring the predetermined pattern on the object to a desired position relative to the tool.

None of the prior constructions shows an apparatus and method of pattern location utilizing an adaptive threshold for determining if the digital output produced from the analog output of a video camera is of one digital level or another digital level.

SUMMARY OF THE INVENTION

The appartus and method for pattern location disclosed herein includes a video camera producing an analog output of a scan, which can be a raster scan, of the light incident thereto. The video camera is located along an optical path incident to light reflected from the surface of an object. The surface of the object has several features including a predetermined pattern. It is this predetermined pattern which the apparatus is adapted to locate. As the incident light reflected from the surface of the object is received by the video camera, the camera produces an analog output having an amplitude varying proportionally to the magnitude of the light within the image of the surface at the location within the image corresponding to that section of the analog output. In other words, as the video camera scans the incident light reflected from the object, the analog output produced by the video camera varies in proportion to the magnitude of the light observed by the camera as the image within the incident light is scanned. The analog output of the video camera is connected to the digitizer circuit which converts the analog output to a digital output comprising one of two levels. The analog output is compared to a threshold signal to determine which of the two digital levels the magnitude of the the analog output represents.

The analog output is also connected to an integrator circuit which produces an output which represents the integral of the magnitude of the analog output of the video camera over time. The integrator can be connected to integrate only a selected portion of the scanned image (called hereinafter a window). The integrated output of the integrator is normalized by performing an analog division (or fractional multiplying operation) which adjusts the integrated output according to the size of the window. The larger the window the larger the divisor to produce a normalized output which is independent of the size of the window. The integrated and normalized output can be connected through a manually adjustable potentiometer to the input of an analog sample and hold circuit. The sample and hold circuit can be actuated after each scan to output the updated value of the integrated and normalized output. The output of the sample and hold is the threshold signal. That is the integrated and normalized output is latched into the sample and hold circuit to become its output.

The threshold signal produced by the sample and hold circuit is connected to one input of a comparator. The other input of the comparator is connected to the analog output of the video camera. The comparator produces one digital level when the analog output of the video camera has a preselected relationship with the threshold signal and another digital level when the analog output of the video camera does not have the preselected relationship with the threshold signal. The preselected relationship can be, for example, the difference in magnitude between the analog output and the threshold signal. When the difference in magnitude is equal to or exceeds a certain value, the comparator produces one digital level, and when the difference in magnitude is less than the certain value, the other digital level is produced.

The output of the comparator is connected to a video synchronization circuit. The synchronization circuit samples the output of the comparator at a known rate (and in regard to the vertical and horizontal synchronization signals). The serial output of the sampling is loaded into a shift register for conversion to a parallel word format. The parallel words are transferred to and stored into a video memory. The method and arrangement of storage is under computer control to insure that a proper relationship between the storage locations of the parallel words and the image of the surface of the object within the reflected light is maintained. In other words the relationship of each bit of the parallel words and the locations represented by each bit within the image is known.

A reference representation of the predetermined pattern is contained in a reference memory. The reference representation can, for example, be loaded into the reference memory from the video memory by direction of an operator during a setup procedure. In fact the operator can select the predetermined pattern. Once the predetermined pattern is selected and stored, the apparatus of the present invention can locate the predetermined pattern on the surfaces of a plurality of objects which are sequentially presented to the view of the video camera.

The video memory and the reference memory are connected to a correlator. The correlator compares the reference pattern with the video representation stored in the video memory. The video representation is shifted by the correlator to determine the best match between the video representation and the reference pattern. The best match can be determined by finding the location within the video representation which has the fewest mismatches with the reference pattern. Once the best match is determined the location is stored and the predetermined pattern again located within the video representation utilizing a refined procedure if desired. The refined procedure makes use of the location of the pattern determined in the prior procedure. The relative shifting of the reference pattern and the video representation is less for each attempted match. Prior to performing the refined procedure the computer determines if the accumulated mismatches for the best match is sufficiently small that it representations the results of an actual location of the predetermined pattern on the object.

The window discussed above is set by the computer. If the predetermined pattern is within the window, the computer can reduce the area of the window to another preselected size for the next object. If the predetermined pattern is not within the window, then the computer can enlarge the size of the area of the window. Then a new correlation procedure is attempted. This enlarged window size is also used in the correlation procedure for the new object.

The apparatus of the present invention can be utilized to locate more than one predetermined pattern on the surface of an object. The first pattern is located and its location is stored within the computer. The second pattern is located, utilizing a different window, and its location is stored within the computer. The computer then determines the differences between the actual location of the patterns and stored reference locations. This allows the computer to calculate the displacement in the X and Y directions and the angular displacement. The displacements are then supplied to a displacement control for an X-Y table which supplies relative movement between the object and a tool. If it is not necessary to have the angular displacement then the location apparatus need only locate one predetermined pattern and supply the displacement control with the displacement in the X and Y directions resulting from the location of only that one predetermined pattern. The computer can act as the displacement control if desired.

It is an advantage of the present invention to provide an adaptive threshold circuit within a pattern location apparatus.

It is another advantage of the present invention to provide an adaptive threshold circuit which is adapted to determine a proper threshold for comparison to a video analog output during a single scan of a video camera.

A further advantage of the present invention is to provide an adaptive threshold circuit which is capable of determining a proper threshold signal for comparison to an analog output from a video camera by integrating a single scan of the analog output.

Another advantage of the present invention is to provide a window of a size selected from a plurality of areas for storing the digitized output of the video camera representing the area within the window of the image presented to the camera.

An additional advantage of the present invention is to provide a predetermined pattern location apparatus which can locate predetermined patterns of different sizes by storing a reference representation of the predetermined pattern having different sizes as selected.

DESCRIPTION OF THE PREFERRED EMBODIMENT

Figure 1:
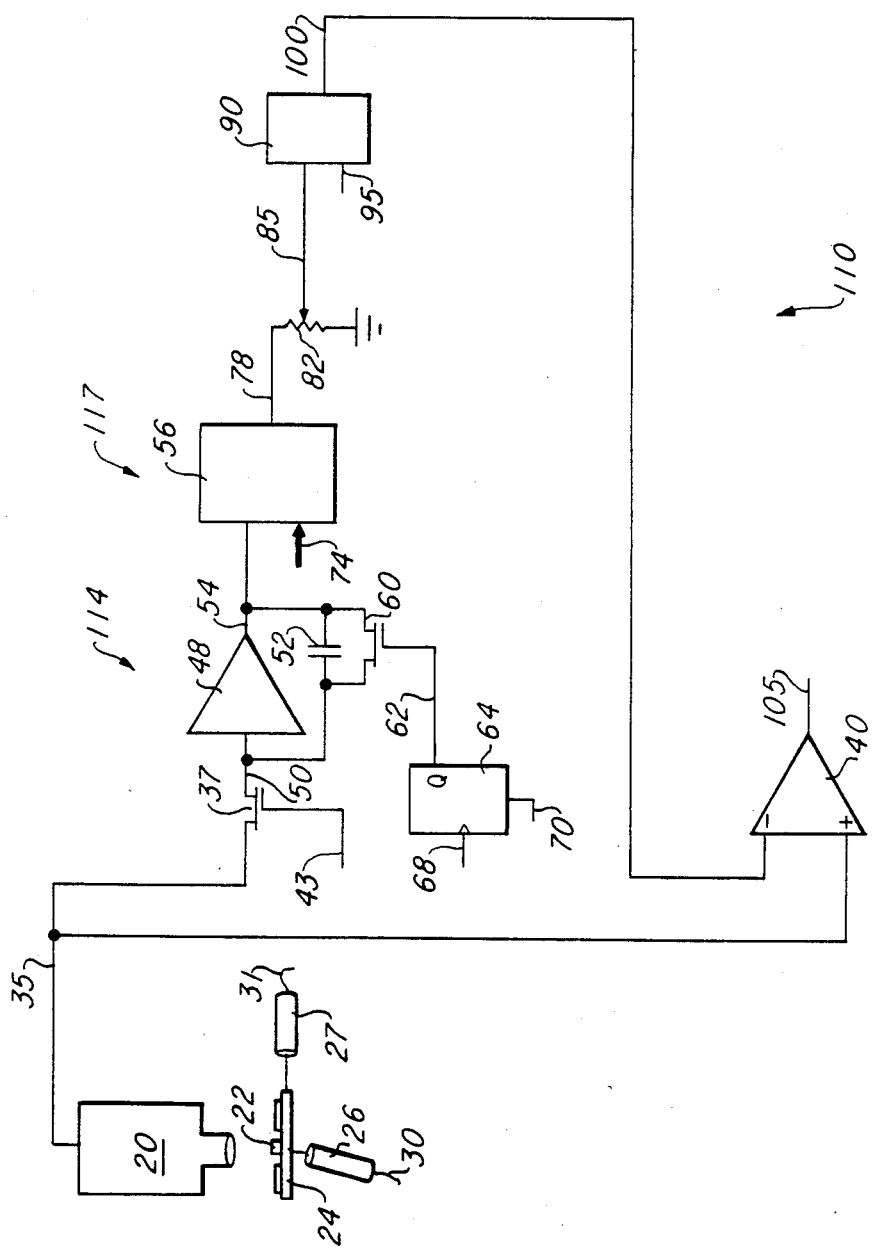
FIG. 1 is a detailed block diagram of an adaptive threshold circuit.

With reference to the drawings and in particular to FIG. 1 thereof, a video camera 20 is focused to observe an object 22 which can be, for example, a semiconductor integrated circuit. The object 22 is positioned on an X-Y table 24 which is movable by motors 26 and 27. Motors 26 and 27 are connected through lines 30 and 31, respectively, to a displacement control which supplies the necessary positioning signals to motors 26 and 27 through lines 30 and 31, respectively. Associated with table 24 is a tool (not shown in FIG. 1). Table 24 provides relative movement between the tool and object 22. The purpose of the system shown herein is to locate a predetermined pattern on object 22 to determine any positioning error between the actual position of object 22 relative to the tool and a desired relative position.

An example of a tool and various displacement controls are shown in U.S. Pat. No. 3,776,447 issued on Dec. 4, 1973 to Adams et al and entitled "Automatic Semiconductor Bonding Machine", U.S. Pat. No. 4,352,125 issued on Sept. 28, 1982 to Guth and entitled "Recognition Apparatus", and U.S. Pat. No. 3,539,256 issued on Nov. 10, 1970 to Ables and entitled "Step and Repeat Camera with Computer Controlled Film Table", which are incorporated by reference herein.

Camera 20 can be of the raster scanning type and produces an analog output of the light reflected from object 22 during each scan of the plurality of optical scans. As camera 20 scans object 22, the magnitude of the analog output produced is proportional to the light received from the point on object 22 currently being scanned. Thus an image of object 22 which is comprised of the light reflected from object (and as shown in FIG. 1 the upper surface thereof) is converted to analog output of varying amplitude. The analog output of camera 20 is connected through line 35 as an input to a semiconductor switch 37 and a comparitor 40. Switch 37 is closed by a signal on line 43. When switch 37 is closed, the analog output of camera 20 is connected as an input to operational amplifier 48 through line 50. Line 50 is also connected to one side of a capacitor 52. The output of operational amplifier 48 is connected through line 54 to the input of an analog multiplier 56 (which is a multiplexing DAC) and to the side of capacitor 52 away from its connection to line 50. A semiconductor switch 60 is connected across the sides of capacitor 52. When switch 60 is closed by a signal on line 62 from the Q output of flip-flop 64, capacitor is effectively shorted and the stored charge on the capacitor 54 is discharged through switch 60. This occures when a new scan is commenced and is initiated by the placement of appropriate signals on lines 68 and 70. The desired result is that switch 60 is closed while the vertical scan signal to camera 20 is being reset to initiate a new scan for a sufficient period to discharge capacitor 52.

Analog multiplier 56 also receives inputs through multiline channel 74. The analog input from operational amplifier 48 connected through line 54 to analog multiplier 56 is multiplied an amount determined by the digital inputs to analog multiplier 56 through channel 74. The output of analog multiplier 56 is connected through line 78 to one end of a potentiometer 82, which has its other opposite end connected to ground. The contact of potentiometer 82 is connected through line 85 to the input of a sample and hold circuit 90. Sample and hold circuit 90 also receives an input from line 95. The output of sample and hold circuit is connected through line 100 to the negative input of comparitor 40 with line 35 from camera 20 connected to the positive input of comparitor 40. The output of comparitor 40 is connected to line 105.

In operation, the adaptive threshold circuit 110 of FIG. 1 receives the analog output of camera 20. Switch 37 is closed to allow selected portions of the analog output of camera 20 to be received as inputs by amplifier 48. The selected portions correspond to a cross-sectional area of the image reflected from the object 22. In other words, only the analog output from camera 20 corresponding to a selected portion of the surface of object 22 is connected to the input of amplifier 48 under the control of switch 37. The selected area could if desired comprise the entire surface of object 22 or any lesser part thereof. Operational amplifier 48 and capacitor comprise an integrator 114. The output of operational amplifier 48 after a scan of object 22 is a representation of the entire amount of light reflected from the selected area within the window controlled by switch 37 as received by camera 20. The analog multiplier 56 acts to reduce the amplitude of the signal received from amplifier 48. The fractional value supplied on channel 74 is determined by the size of the window. The analog multiplier 56 comprises a normalizer 117. Thus, amplifier 48 produces an integrated signal and multiplier 56 produces a normalized signal.

The normalized output of multiplier 56 provides an updated value with which the analog output of the camera 20 can be compared. Potentiometer 82 provides a manual adjust for the threshold signal if desired. After the scan is completed, the output of potentiometer 82 is stored into sample and hold circuit 90 for use during the next scan. After the output of potentiometer 82 is stored into sample and hold circuit 90 switch 60 can be closed to reset the integrator 114 for the next scan. Thus, an adaptive threshold circuit is provided which allows an updated threshold level to be available to comparitor 40 after each scan which allows rapid adjustments to changes in the light level and to differences in the amount of light reflected from different objects which replace object 22 but are substantially identical therewith.

The output of comparitor 40 is one of two digital levels. The digital level selected is determined by a preselected relationship between the analog output of camera 20 and the threshold signal from sample and hold circuit 90. For example, comparitor 40 can produce a high signal when the magnitude of the analog output of camera 20 is equal to or exceeds the magnitude of the threshold signal from sample and hold circuit 90. Comparitor 40 can then produce a low signal when the magnitude of the analog output of camera 20 is less than the magnitude of the threshold signal of sample and hold circuit 90.

Figure 2:
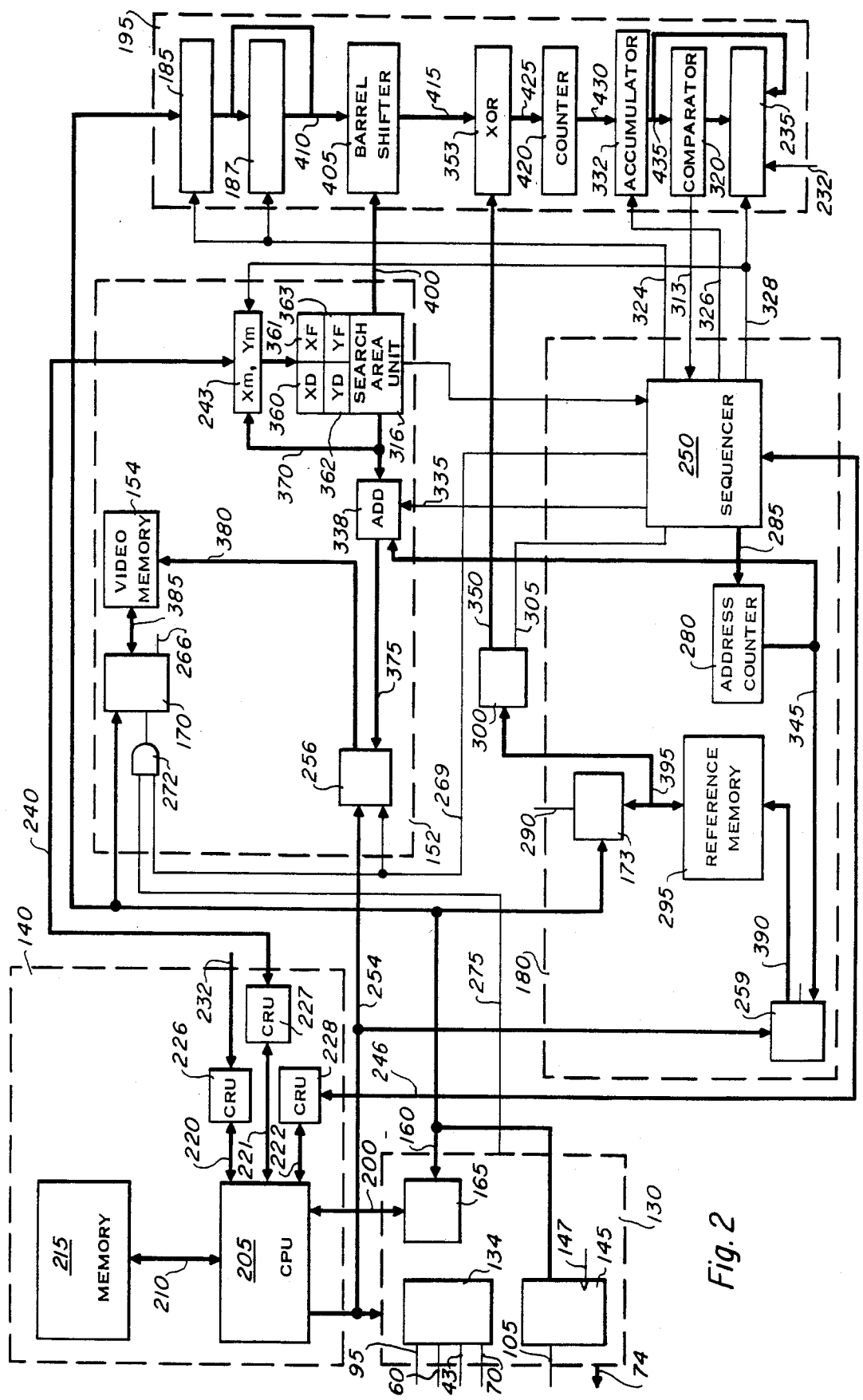
FIG. 2 is a block diagram of a system for pattern location.

As shown in FIG. 2, a video synchronization circuit 130 has as outputs lines 43, 68, 70, and 95, and channel 74. A plurality of flip-flops 134 is provided within circuit 130 to allow the proper signals to be set thereinto as determined by the logic within circuit 130 as directed by computer 140. The necessary logic within circuit 130 can be standard controller logic with appropriate counters and storage elements or a microcontroller. Channel 74 is also connected to a plurality of flip-flops or a register within circuit 130. However, the appropriate sequencing and/or nature of the outputs of circuit 130 to lines 43, 68, 70, and 95, and channel 74 has been discussed above in connection with FIG. 1. Line 105 from the output of comparitor 40 (FIG. 1) is connected to the input of shift register 145. An appropriate clock signal is provided on line 147 to insure that each line of the scan is divided into the proper number of digital signals. The digital signals are clocked into the shift register 145 (which is a 75LS347 manufactured by Texas Instruments Incorporated of Dallas, Tex.) until it is full and then the contents of the shift register 145 is transferred into the video memory circuit 152 for storage into the video memory 154 as a digital representation of the image observed by camera 20 (FIG. 1). The output of shift register 145 is connected to a multiline channel 160. Channel 160 is also connected to a bidirectional tri-state buffer 165 (which is a 74LS245 manufactured by Texas Instruments Incorporated of Dallas, Tex.). It should be noted that certain components have a specific commercial designator associated therewith. The purpose is to provide the reader with additional information as to the nature of the components where appropriate. Channel 160 is connected to bidirectional tri-state buffer 170 within video memory circuit 152 and to bidirectional tri-state buffer 173 within reference memory circuit 180. Channel 160 is also connected to registers 185 and 187 located within correlator 195. The buffer 165 is also connected to multiline channel 200 on its side away from its connection to channel 160. Channel 200 is also connected to CPU (central processing unit) 205 within computer 140.

CPU 205 is connected through multiline channel 210 to memory 215 in computer 140. Memory 215 contains the direct data and program storage for the computer 140. The computer 140 can be, for example, a 990/101 as manufactured by Texas Instruments, Incorporated. The computer is connected through multiline channels 220, 221, and 222 to CRUs (communication register units) 226, 227, and 228, respectively. Other CRUs can be provided as necessary, for example, to communicate with the displacement circuit discussed above. The side of CRU 226 away from its connection to CPU 205 is connected through multiline channel 232 to register 235 within correlator 195. CRU 227 is connected through multiline channel 240 to register 243 within video memory circuit 152. CRU 228 is connected through multiline channel 246 to sequencer 250 within reference memory circuit 180.

The CPU 205 has its data external data lines connected to channel 200. The address lines of CPU 205 are connected to multiline channel 254. Channel 254 is also connected to video synchronization circuit 130 for storing information for control purposes therein. Channel 254 is connected to multiplexer 256 (which is a 74LS157 manufactured by Texas Instruments Incorporated of Dallas, Tex.) within video memory circuit 152 and to multiplexer 259 (which is a 74LS157 manufactured by Texas Instruments Incorporated of Dallas, Tex.). The output of shift register 145 is stored into video memory 154 to form a digital representation of the image observed by camera or at least a portion of the image within a window set by the CPU. The CPU can set through line 266 connected to control buffer 170 the necessary control to allow it to store the output of shift register 145 into video memory 154. However, in normal operation the sequencer 250, which is a microcontroller combined with peripheral logic circuits, performs the task of storing the output of shift register 145 into video memory 154 through line 269 which is connected to one input of AND gate 272 and to the control input of multiplexer 256. With an appropriate signal on line 269, when video synchronization circuit 130 indicates on line 275 that shift register 145 is full and prepared to transfer information buffer 170 is connected to receive the output of register 145.

Sequencer 250 is adapted to provide a number of control signals to various other elements within the system of FIG. 2. The sequencer receives instructions from the CPU 205 through channel 246 and CRU 228. The sequencer provides the necessary control signals to address counter 280 through multiline channel 285. These signals would include a clock signal indicating that the counter should increment. The function of buffer 173 is controlled by line 290 connected to sequencer 250. The side of buffer 173 away from its connection to channel 160 is connected to reference memory 295 and a latch 300 (which is an 74LS273 manufactured by Texas Instruments Incorporated of Dallas, Tex.). The latch function of latch 300 is controlled by sequencer 250 through line 305. The sequencer 250 receives inputs from lines 312 and 313 connected to search area unit 316 within video memory circuit 152 and to comparitor 320 within correlator 195. In addition, sequencer 250 has outputs connected through lines 324, 326, and 328 to registers 185 and 187, to accumulator 332 within correlator 195, and to registers 235 and 243, respectively. Sequencer 250 also supplies a carry bit through line 335 to adder 338 within video memory circuit 152.

The output of address counter 280 is connected through multiline channel 345 as an input to multiplexer 259 and adder 338. The output of latch 300 is connected through multiline channel 350 as an input to an parallel exclusive OR circuit 353 within correlator 195.

The search area unit 316 receives data from the CPU for storage into registers 360-363. The registers 360-363 contain the X and Y coordinates for the search area within the representation stored in video memory 154. The coordinates contain the address of the first X and the first Y memory location to be transferred from video memory 154 through channel 385 to registers 185 and 187. These registers also contain the coordinates of the last memory location to be transferred. When the last part of the representation has been transferred to registers 185 and 187, the search area unit so indicates to sequencer 250 through line 312. The search area unit 316 is connected through multiline channel 370 to adder 338 and to register 243. The search area unit 316 supplies the base coordinates to adder 338, which are combined with the address from address counter 280 to produce the appropriate address within video memory 154. The output of adder 338 is connected through multiline channel 375 as an input to multiplexer 256. When selected by sequencer 250 the address produced by adder 338 is connected to the addressing inputs of video memory 154 through multiplexer 256. The output of multiplexer 256 is connected to the address inputs of video memory 154 through multiline channel 380. The data lines of video memory 154 are connected through multiline channel 385 to the side of buffer 170 away from its connection to channel 160.

The addressing inputs of reference memory 295 are connected through multiline channel 390 to the output of multiplexer 259. The data lines of reference memory 295 are connected through multiline channel 395 to the side of buffer 173 away from its connection to channel 160 and as an input to latch 300. The output of search area unit 316 connected to multiline channel 400 is connected to the barrel shifter 405 within correlator 195 as an input.

The barrel shifter 405 is connected through multiline channel 410 to registers 185 and 187. The output of barrel shifter 405 is connected through multiline channel 415 to exclusive OR circuit 353. The output of exclusive OR circuit 353 is connected to counter 420 through multiline channel 425. The output of counter 420 is connected through multiline channel 430 to accumulator 332. A multiline channel 435 connects the output of accumulator 332 to comparitor 320 and to register 235.

In operation, the operator initiated a setup procedure which defines the predetermined pattern. A scan of the object is stored into the video memory under the control of computer 140. The operator then positions a cursor on a monitor (not shown) and defines the predetermined pattern and supplies the size of the predetermined pattern. If more than one predetermined pattern is to be utilized, then the additional pattern is defined by the operator. The computer then stores the predetermined pattern or patterns into reference memory 295. The pattern location system is now ready to locate the predetermined pattern located on an object presented to the camera. When the object is mechanically positioned, the video synchronization circuit is initiated and a scan of the object is stored into the video memory 154. The computer loads the search area coordinates into registers 360-363. The sequencer 250 is informed by the computer of the size of the predetermined pattern stored in reference memory 295. The location of the predetermined pattern then begins. The initial part of the search area is loaded into registers 185 and 187 utilizing the address supplied by the adder 338. The search area unit provides the shifting information to barrel shifter 405. The output of the shifter 405 is compared with the initial part of the predetermined pattern latched into latch 300 by exclusive OR gate 353. The address supplied by the address counter 280 is utilized to address the reference memory 295 for latching into latch 300. The number of mismatches is located by exclusive OR gate 353 is counted by counter 420 as the representation in video memory 154 representing a row or column of video. After completing the row or column, the total of the mismatches is summed into accumulator 332. After every row or column is examined, the output of the accumulator is compared with the contents of register 235. If the contents of register 235 is greater that the contents of accumulator, the contents of accumulator 332 is loaded into register 235 and the address of that location within video memory 154 is loaded into register 243. The operation continues until the best match is located. The computer then accesses the registers 243 and 232 to determine if the result meets certain preselected criterion.

If the location is determined to be valid, the computer can specify a refined search in which the search area unit has starting coordinates closer to the location in register 243 and a smaller bit shift address output to barrel shifter 405.

Figure 3:
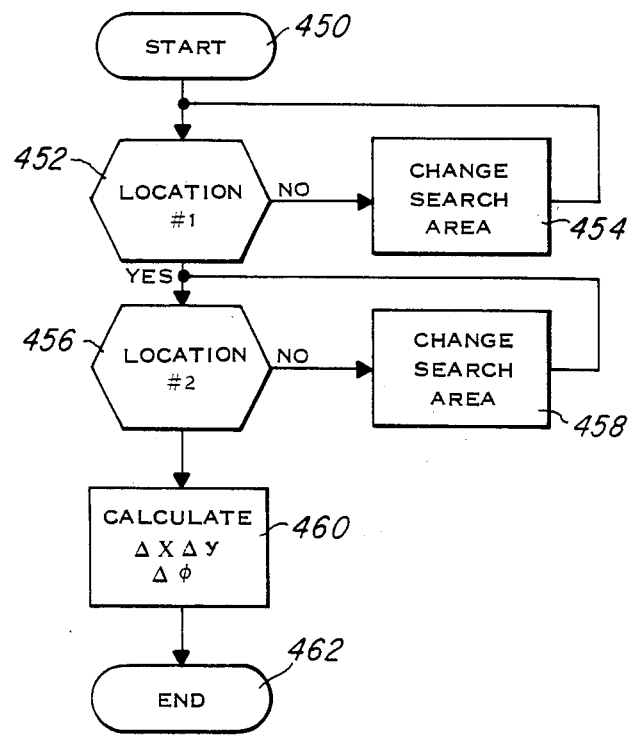
FIG. 3 is a logic diagram of a portion of the operation of the system of FIG. 2.

As shown in FIG. 3, a logic diagram describes a portion of the operation of the computer 140 if it is desired to locate two predetermined patterns. This operation begins in logic step 450 and exits step 450 to enter logic state 452. In state 452 the location of the first predetermined pattern is detected if possible. If the location is not found then the logic enters logic step 454. In step 454 the search area is enlarged. The logic then reenters state 452 and another attempt to locate the first predetermined pattern is made. If the pattern is found, the logic exits state 453 and enters state 456. In state 456, the location of the second predetermined pattern is detected if possible. If the location is not found then the logic enters logic step 458 where the search area is enlarged. The logic then reenters state 456. If the second predetermined pattern is found the logic exits state 456 and enters step 460. In step 460 the computer calculates the differences between the actual location of the predetermined patterns and the desired location. This information is supplied to the displacement control discussed above. That information includes the X and Y displacement and any angular displacement. The logic then exits step 460 and enters step 462 which ends this procedure.

Figure 4:
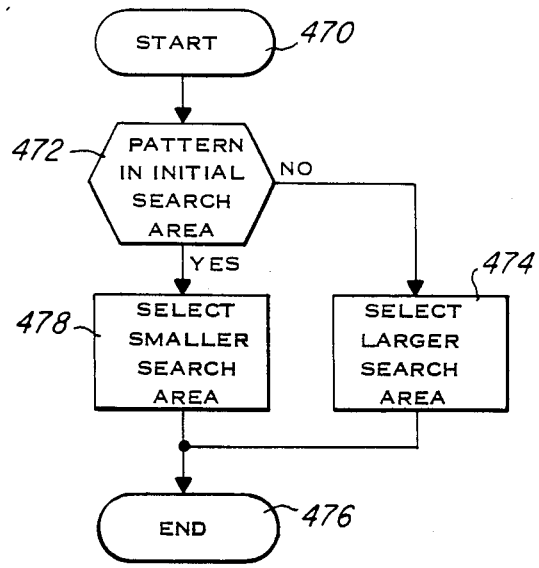
FIG. 4 is a logic diagram of a portion of the operation of the system of FIG. 2.

In FIG. 4, a logic step 470 begins a procedure of the computer. The logic exits step 470 and enters logic state 472. In state 472 the computer determined if the predetermined pattern was located within the initial search area. If the predetermined pattern was not located within the initial search area, the logic exits state 472 and enters step 474. In step 474, the search area is enlarged to another selected area from a plurality of selectable areas for the next object presented to camera 20 (FIG. 1). The logic then exits step 474 and enters step 476 wherein the computer continues with other procedures. If while the logic is in state 472 that the pattern was located within the initial search area, the logic exits state 472 and enters step 478. In step 478 the search area is reduced to another selected area selected from a plurality of selectable search areas. The logic then enters step 476.

Having described the invention in connection with certain specific embodiments thereof, it is to be understood that further modifications may now suggest themselves to those skilled in the art, it is intended to cover all such modifications as fall within the scope of the appended claims.

What is claimed is:

1. Apparatus for location of a predetermined pattern on a surface of an object comprising:
   a. an imaging camera incident to light reflected from said object producing an analog output corresponding to an image of said surface during each of a plurality of optical scans;
   b. a reference memory storing a reference representation of said predetermined pattern;
   c. an adaptive threshold circuit connected to receive said analog output for receiving one optical scan of said optical scans and producing a threshold output determined from the magnitude of at least a portion of said analog output, the adaptive threshold circuit includes an integrator means for integrating the analog output over one scan of said plurality of optical scans, and a normalizing means for normalizing the magnitude of the integrated analog output by a factor corresponding to the area of said scan to obtain the threshold signal thereby;
   d. a comparator connected at one input to receive said analog output and another input to receive said threshold output, said comparator producing an indication at a digital output when the difference between the magnitudes of said threshold output exceed a preselected value;
   e. a video memory connected to said comparator to receive said digital output and storing a digital representation of said image; and
   f. a logic network connected to said video memory and said reference memory and detecting location of aid predetermined pattern within said image.

2. An alignment system for determining the location of predetermined pattern within an image in relation to a tool comprising:
   a. an object having said predetermined pattern thereon;
   b. a positioning table movable in at least one direction;
   c. an imaging camera producing an analog output proportional to the amount of light incident thereto reflected from said object during a series of optical scans of said object;
   d. an adaptive threshold circuit connected to receive said analog output and providing a threshold output for a first optical scan of said object determined from said analog output of said camera during a second optical scan of said object prior to said first optical scan, the adaptive threshold circuit includes an integrator means for integrating the analog output over one scan of said plurality of optical scans, and a normalizing means for normalizing the magnitude of the integrated analog output by a factor corresponding to the area of said scan to obtain the threshold signal thereby;

e. a comparator connected to receive said analog output at one input and said threshold output at another input to produce an indication at a digital output when difference in magnitude between said analog output and said threshold output exceeds a preselected level;

f. a reference memory for storing a reference representation of said predetermined pattern;

g. a video memory for storing a video representation of said digital output of said comparator;

h. a logic network connected to said reference memory and to said video memory and comparing said video representation with said reference representation to locate said predetermined pattern with said video representation producing a displacement signal indicating the location of said predetermined pattern;

i. displacement device connected intermediate said object and said tool for relative movement therebetween in response to a control signal; and j. a displacement control connected to said logic network to receive said displacement signal and connected to said displacement device to generate said control signal in response to said displacement signal.

3. System as set forth in claim 2 including a video selection circuit in electrical communication with said video memory to provide a selected portion of said video representation to said logic network.

4. System as set forth in claim 3 wherein said selected portions represent a rectangular area on said said object.

5. System as set forth in claim 4 wherein the magnitude of said rectangular area is one of a plurality of selectable rectangular areas.

6. A method of pattern location comprising the steps of:

a. repeatedly scanning surface of an object with a video camera to produce an analog output;

b. integrating said analog output corresponding to a preselected area on the surface of said object to form an integrated signal during one scan;

c. normalizing the magnitude of said integrated signal by a factor corresponding to the magnitude of said preselected area to produce a normalized output;

d. storing said normalized output during said one scan; and e. comparing said normalized output to the analog output during another scan subsequent to said one scan to produce a digital output.

* * * * *